(12) United States Patent (10) Patent No.: US 7,667,926 B2
Naruse (45) Date of Patent: Feb. 23, 2010

(54) DISK DEVICE

(75) Inventor: Hitoshi Naruse, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 372 days.

(21) Appl. No.: 11/711,658

(22) Filed: Feb. 28, 2007

(65) Prior Publication Data

US 2007/0201163 A1 Aug. 30, 2007

(30) Foreign Application Priority Data

Feb. 28, 2006 (JP) ............................. 2006-053836

(51) Int. Cl.
*G11B 33/08* (2006.01)
(52) U.S. Cl. .................................... 360/97.02
(58) Field of Classification Search .... 360/97.02–97.04
See application file for complete search history.

(56) References Cited

U.S. PATENT DOCUMENTS

| | | | | |
|---|---|---|---|---|
| 5,214,549 | A * | 5/1993 | Baker et al. ............... | 360/97.02 |
| 6,493,180 | B1 | 12/2002 | Kang et al. | |
| 6,529,345 | B1 | 3/2003 | Butler et al. | |
| 6,567,237 | B2 * | 5/2003 | Iwahara et al. ........... | 360/97.02 |
| 6,661,604 | B2 * | 12/2003 | Hashizume et al. ...... | 360/97.02 |
| 6,721,128 | B1 * | 4/2004 | Koizumi et al. .......... | 360/97.02 |
| 6,747,840 | B2 | 6/2004 | Daniel et al. | |
| 6,876,513 | B2 | 4/2005 | Watanabe et al. | |
| 6,903,898 | B2 * | 6/2005 | Nonaka et al. ........... | 360/97.01 |
| 6,961,208 | B2 * | 11/2005 | Kant et al. ................ | 360/97.02 |
| 7,199,970 | B2 * | 4/2007 | Boss et al. ................ | 360/97.02 |
| 7,292,406 | B1 * | 11/2007 | Huang ...................... | 360/97.02 |
| 2001/0009486 | A1 * | 7/2001 | Iwahara et al. ........... | 360/97.02 |
| 2002/0181147 | A1 * | 12/2002 | Tokunaga et al. ........ | 360/97.01 |
| 2002/0191331 | A1 * | 12/2002 | Nonaka et al. ........... | 360/97.01 |
| 2003/0081348 | A1 * | 5/2003 | Watanabe et al. ........ | 360/97.01 |
| 2004/0066572 | A1 * | 4/2004 | Hofland et al. ........... | 360/97.01 |
| 2005/0041333 | A1 * | 2/2005 | Lee .......................... | 360/97.02 |
| 2005/0078408 | A1 * | 4/2005 | Nonaka et al. ........... | 360/97.01 |
| 2005/0286163 | A1 * | 12/2005 | Kim et al. ................. | 360/97.02 |
| 2006/0034010 | A1 * | 2/2006 | Abe et al. ................. | 360/97.02 |

FOREIGN PATENT DOCUMENTS

JP 9-17174 1/1997

(Continued)

OTHER PUBLICATIONS

English-machine translation of JP 2003-132656 A to Watanabe et al., published on May 9, 2003.*

(Continued)

*Primary Examiner*—William J Klimowicz
(74) *Attorney, Agent, or Firm*—Pillsbury Winthrop Shaw Pittman, LLP

(57) ABSTRACT

A case of a disk device has an open-topped rectangular base and a top cover in the form of a rectangular plate screwed to the base. A label is pasted on the top cover. Provided in the case are a disk-shaped recording medium, a head for recording and reproducing information to and from the recording medium, and a mechanical section. The top cover has a depression formed by drawing, the label is pasted on the top cover so as to cover the depression, and at least a part of the depression is exposed to form an opening portion.

13 Claims, 5 Drawing Sheets

FOREIGN PATENT DOCUMENTS

| | | |
|---|---|---|
| JP | 3031211 | 2/2000 |
| JP | 2000-163948 | 6/2000 |
| JP | 2001-167554 | 6/2001 |
| JP | 2003132656 A * | 5/2003 |
| JP | 2003308016 A * | 10/2003 |
| JP | 2004-5783 | 1/2004 |
| JP | 2004152425 A * | 5/2004 |
| JP | 2004192750 A * | 7/2004 |
| JP | 2004265545 A * | 9/2004 |

OTHER PUBLICATIONS

Japanese Office Action dated May 7, 2008 for Appln. No. 2006-053836.

* cited by examiner

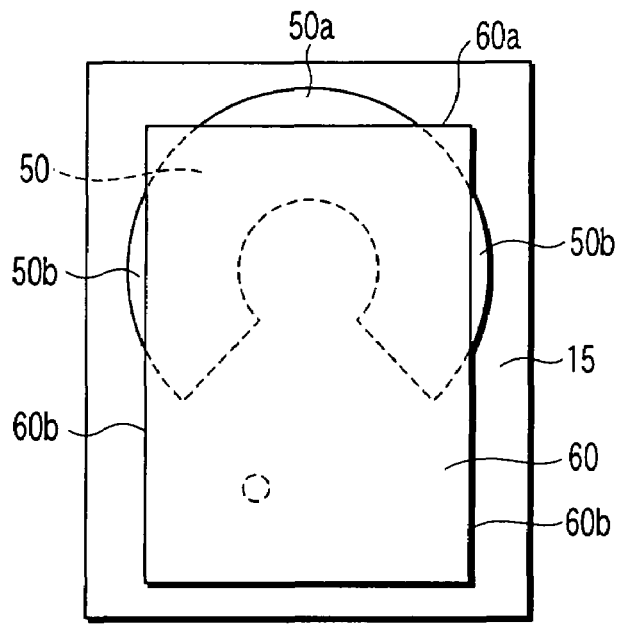
FIG. 6
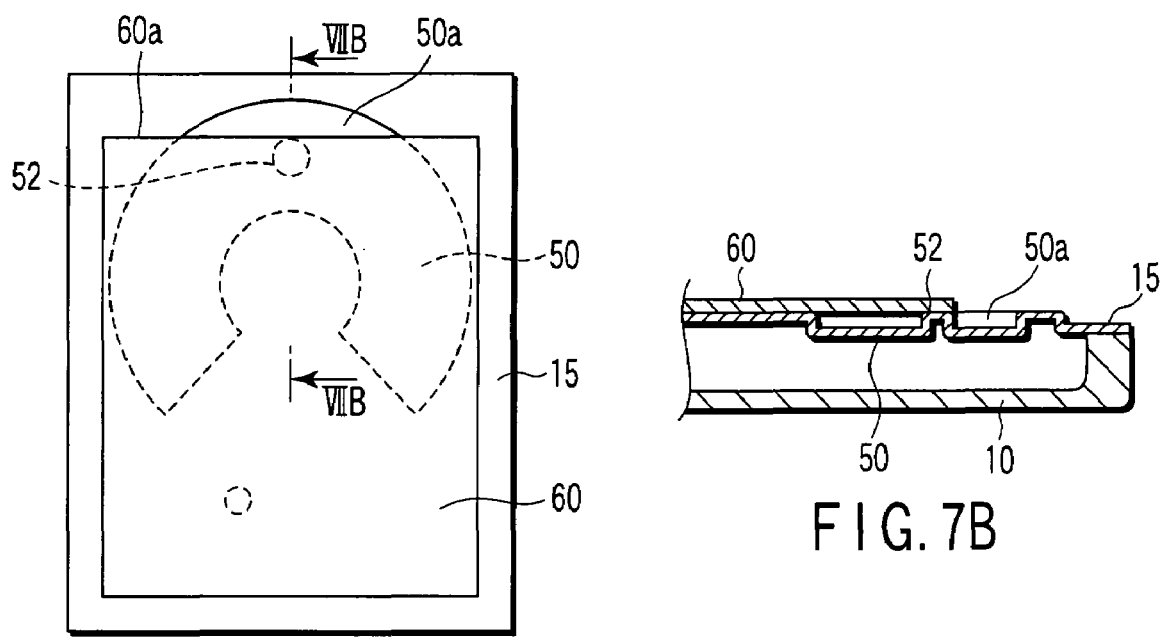
FIG. 7A
FIG. 7B

DISK DEVICE

CROSS-REFERENCE TO RELATED APPLICATIONS

This application is based upon and claims the benefit of priority from Japanese Patent Application No. 2006-053836, filed Feb. 28, 2006, the entire contents of which are incorporated herein by reference.

BACKGROUND

1. Field

An example of this invention relates to a disk device having a disk for use as a recording medium.

2. Description of the Related Art

In recent years, disk devices, such as magnetic disk devices, optical disk devices, etc., have been widely used as external recording devices of computers or image or music recording/reproducing apparatuses.

For example, a magnetic disk device generally comprises a magnetic disk, spindle motor, head actuator, voice coil motor, circuit board unit, etc., which are arranged in a case. The spindle motor supports and rotates the magnetic disk. The head actuator supports magnetic heads and the voice coil motor drives the head actuator. The head actuator is provided with a bearing portion attached to the case and arms that are stacked on the bearing portion and extend from the bearing portion. A magnetic head is mounted on each arm by means of a suspension.

According to a device disclosed in Jpn. Pat. Appln. KOKAI Publication No. 2004-5783, for example, a case is composed of an open-topped base on which mechanical sections are mounted and a top cover that covers an opening of the base. Normally, the top cover is fastened to the peripheral edge portion of the upper surface of the base with screws. In order to enhance the rigidity of the top cover, it is provided with a drawn portion, e.g., a circular arcuate depression. Further, a nameplate label that indicates the model number, manufacturer, etc. of the magnetic disk device is pasted on a surface of the top cover. The label is stuck to the top cover surface so as to conceal the whole depression.

The magnetic disk device constructed in this manner undergoes vibration that is caused by rotations of the spindle motor and the magnetic disk, vibration of the head actuator attributable to a windage that is caused by the rotation of the magnetic disk, vibration that is caused by a seek action of the head actuator, etc. The vibrations of the spindle motor and the head actuator, which behave as vibration generating portions, are transmitted to the plate-shaped top cover through the base and a pivot or the like of the head actuator. Thereupon, the top cover vibrates and generates noise. If the frequency of normal mode of vibration of the cover is approximate to a frequency transmitted to the top cover, in particular, resonance is developed, so that the vibration amplitudes of the spindle motor and the head actuator increase. In consequence, noises also increase inevitably.

In the case where the nameplate label covers the whole surface of the drawn portion of the top cover, the vibration of the top cover is transmitted to the nameplate label by air propagation and solid propagation, whereupon the label vibrates. The vibration of the label is transmitted again to the top cover by air propagation, so that the vibration of the top cover is excited inevitably. Owing to this phenomenon, the magnitude of the vibration of the top cover increases, so that the level of the noise from the top cover is raised. If a vibration damper is stuck to the drawn portion in order to suppress the vibration of the top cover to reduce the noise, the number of parts increases, resulting in an increase in cost.

Modern magnetic disk devices that are used in a wide variety of fields require reduction of noises.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is an exemplary plan view showing an HDD according to a second embodiment of the invention;

FIG. 7A is an exemplary plan view showing an HDD according to a third embodiment of the invention;

FIG. 7B is an exemplary sectional view of the HDD taken along line VIIB-VIIB of FIG. 7A;

DETAILED DESCRIPTION

Various embodiments according to the invention will be described hereinafter with reference to the accompanying drawings. In general, according to an embodiment of the invention, there is provided a disk device comprising: a case having an open-topped rectangular base and a plate-shaped top cover which closes a top opening of the base; a label pasted on the top cover; a disk-shaped recording medium provided in the case; a head for recording and reproducing information to and from the recording medium; and a mechanical section which is located in the case and drives the recording medium and the head, the top cover having a depression formed by drawing, the label being stuck to the top cover so as to cover the depression, at least a part of the depression being exposed to form an opening portion.

A hard disk drive (hereinafter, referred to as an HDD) according to a first embodiment of this invention will now be described in detail with reference to the accompanying drawings.

Figure 1:
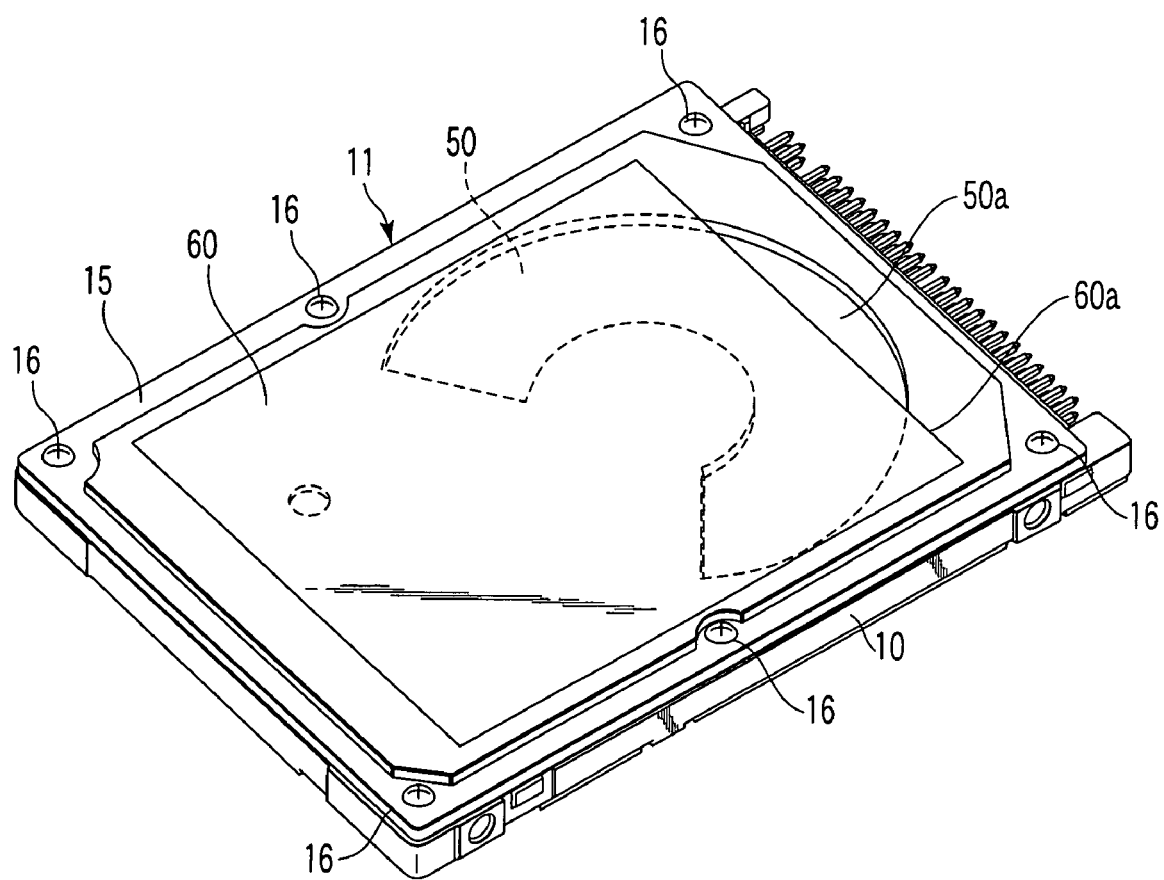
FIG. 1 is an exemplary perspective view showing an HDD according to a first embodiment of the invention.
Figure 2:
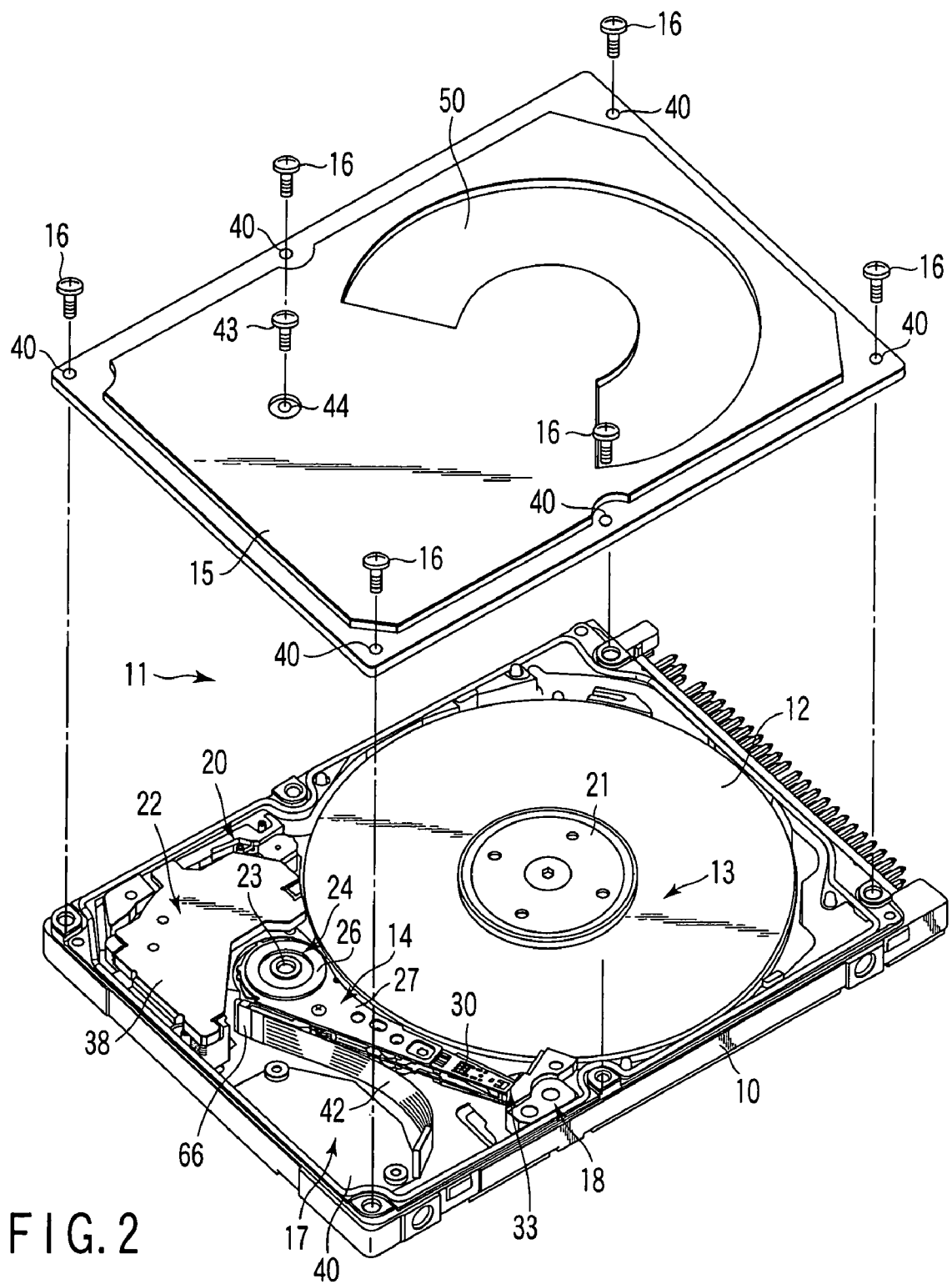
FIG. 2 is an exemplary exploded perspective view showing the HDD.

As shown in FIGS. 1 and 2, the HDD is provided with a case 11. The case 11 comprises a base 10 in the form of an open-topped rectangular box and a top cover 15 shaped like a rectangular plate. The top cover is fastened to the base by screws so as to close a top opening of the base.

The base 10 contains a magnetic disk 12, spindle motor 13, magnetic heads 33, head actuator 14, voice coil motor (VCM) 22, ramp load mechanism 18, inertia latch mechanism 20, and flexible printed circuit board (FPC) unit 17. The magnetic disk 12 serves as a recording medium. The spindle motor 13 supports and rotates the magnetic disk. The magnetic heads 33 record and reproduce information to and from the magnetic disk. The head actuator 14 supports the magnetic heads for movement with respect to the magnetic disk 12. The VCM 22 rocks and positions the head actuator. The ramp load mechanism 18 holds the magnetic heads in a position at a distance from the magnetic disk when the heads are moved to the outermost periphery of the disk. The inertia latch mechanism 20 holds the head actuator 14 in a retracted position if a shock or the like acts on the HDD. Electronic components, such as a preamplifier, are mounted on the FPC unit 17.

A printed circuit board (not shown) for controlling the operations of the spindle motor 13, VCM 22, and magnetic heads through the FPC unit 17 is screwed to the outer surface of the base 10 and located opposite a bottom wall of the base.

The magnetic disk 12 is formed with a diameter of, for example, 65 mm (2.5 inches) and has magnetic recording layers on its upper and lower surfaces, individually. The disk 12 is coaxially fitted on a hub (not shown) of the spindle motor 13, clamped by a clamp spring 21, and fixed to the hub. The disk 12 is rotated at a predetermined speed of, for example, 5,400 rpm by the motor 13 for use as a drive unit.

The head actuator 14 is provided with a bearing assembly 24 that is fixed on the bottom wall of the base 10. The bearing assembly 24, which functions as a bearing portion, has a pivot 23 set up on the bottom wall of the base 10 and a cylindrical hub 26 that is rotatably supported on the pivot by a pair of bearings. The head actuator 14 is provided with two arms 27 attached to the hub 26, two suspensions 30 extending individually from the arms, the magnetic heads 33 supported individually on the respective extended ends of the suspensions, and spacer rings.

Each magnetic head 33 has a substantially rectangular slider (not shown) and a recording/reproducing magneto resistive (MR) head element formed on the slider. It is fixed to a gimbals portion that is formed on the distal end portion of its corresponding suspension 30. Each magnetic head 33 is electrically connected to a main FPC 42 (mentioned later) through a relay flexible printed circuit board (relay FPC, not shown). The relay FPC is adhered on respective surfaces of each arm 27 and each suspension 30 of the head actuator 14 and extends from the distal end of the suspension to the rocking proximal end of the arm. The relay FPC is formed in the shape of an elongate belt as a whole, its distal end is electrically connected to the magnetic head 33, and its proximal end portion is electrically connected to the main FPC 42. Thus, each magnetic head 33 is electrically connected to the FPC unit 17 through the relay FPC and the main FPC 42.

The arms 27 that are fitted on the outer periphery of the hub 26 are arranged spaced from and parallel to each other. The suspensions 30 and the magnetic heads 33 that are mounted on these arms are situated opposite one another. The VCM 22 has a support frame (not shown) extending from the hub 26 in the direction opposite from the arms 27 and a voice coil supported by the support frame. When the head actuator 14 is set in the base 10, the voice coil is situated between a pair of yokes 38 that are fixed on the base 10 and, in conjunction with these yokes and a magnet (not shown) fixed to one of the yokes, constitutes the VCM 22. If the voice coil is energized, the head actuator 14 rocks, whereupon each magnetic head 33 is moved to and positioned in a region over a desired track of the magnetic disk 12.

Figure 3:
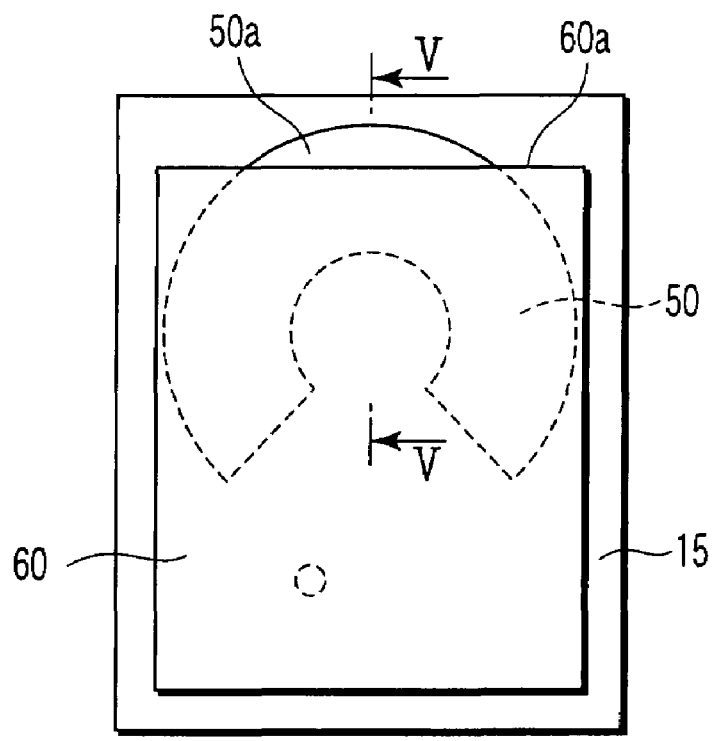
FIG. 3 is an exemplary plan view showing the top cover side of the HDD.

As shown in FIGS. 1 to 3, the top cover 15 in the form of a rectangular plate is formed by press-forming an aluminum alloy plate with a thickness of about 0.4 mm, for example. First apertures 40 are formed individually at four corner portions of the top cover 15 and substantially in the respective centers of a pair of long side edges of the cover. The top cover 15 is fastened to the base 10 by threading screws 16, which are passed individually through the first apertures 40, into threaded holes in the peripheral edge portion of the base 10, and closes the top opening of the base. The top cover 15 faces the magnetic disk 12 across a predetermined gap in substantially parallel relation.

A second aperture 44 is formed in that part of the top cover 15 which faces the pivot 23 of the bearing assembly 24. A part of the top cover 15 and the pivot 23 are fastened to each other by threading a fixing screw 43, which is passed through the second aperture 44, into the upper end portion of the pivot. Accordingly, the opposite end portions of the pivot 23 are supported individually by the base 10 and the top cover 15 of the case 11. Thus, the top cover 15 has the six first apertures 40 for screwing in the peripheral edge portion and the second aperture 44 for screwing that is situated over the pivot 23.

In order to enhance the rigidity of the top cover 15, a depression 50 is formed in the top cover by drawing. The depression 50 has an arcuate or horseshoe shape that is substantially concentric with the center of rotation of the magnetic disk 12 and is situated opposite a surface of the disk 12.

Figure 4:
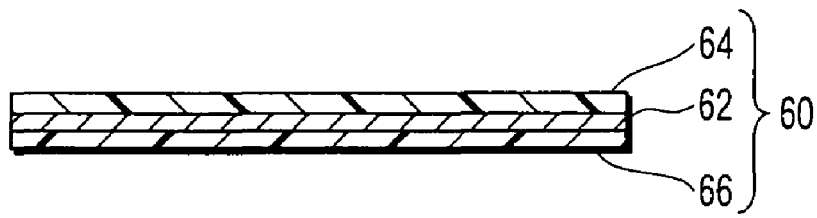
FIG. 4 is an exemplary sectional view showing a nameplate label of the HDD.

A nameplate label 60 for indicating information on the magnetic disk device is pasted on a surface of the top cover 15. As shown in FIG. 4, for example, the label 60 has an indication layer 64 of polyethylene terephthalate or the like, a metal layer 62, and a viscous layer 66. Information can be indicated on the indication layer 64. The metal layer 62 is formed overlapping the indication layer and serves to suppress vibration of the label. The viscous layer 66 is lapped on the metal layer and pasted on the top cover 15. The metal layer 62 is formed of a copper leaf, for example.

Figure 5:
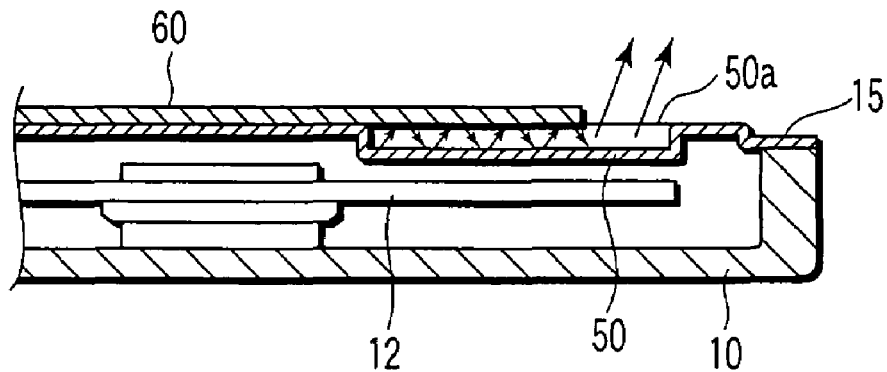
FIG. 5 is an exemplary sectional view of the HDD taken along line V-V of FIG. 3.

As shown in FIGS. 1, 3 and 5, the nameplate label 60 is formed in a rectangular shape and pasted on the top cover 15 in a manner such that its four side edges are aligned individually with the side edges of the cover 15 in substantially parallel relation. The nameplate label 60 is stuck to the top cover 15 so as to cover the whole depression 50 but a part of it. One side edge 60a of the label 60 extends across an edge portion of the depression 50, and a part of the depression 50 is open or exposed to the outside. Thus, the side edge 60a of the label 60 and the depression 50 form an opening portion 50a that opens to the outside.

In performing recording and reproduction with the HDD constructed in this manner, the magnetic disk 12 is rotated by the spindle motor 13. Further, the head actuator 14 is swung by the VCM 22, and a seek action is performed such that each magnetic head 33 is positioned over a target track of the disk 12.

Noises are generated by vibrations that are attributable to the rotation of the spindle motor 13 and the seek action of the head actuator 14. The vibrations generated in the HDD are discharged as noises to the outside through the base 10 and the top cover 15 or the nameplate label 60. These vibrations are classified between solid propagation and gaseous propagation according to their transmission paths.

The solid propagation is vibration with which vibration caused by the rotation of the spindle motor 13 and vibration caused during the seek action are transmitted to the base 10 or the top cover 15. The gaseous propagation is vibration that is induced by a fluctuation of the pressure of a fluid or air that is generated as the magnetic disk 12 rotates. This gaseous propagation is transmitted mainly to the top cover 15 and radiated as noise to the outside. Vibration of the top cover 15 is further transmitted to the nameplate label 60 by solid or gaseous propagation. The label 60 has the viscous layer 66 with which it is pasted on the cover 15. Thus, the label 60 has a vibration suppressing effect to reduce the vibration of the top cover 15 in the region where the label and the cover are pasted together. The vibration suppressing effect is higher if the nameplate label 60 has the metal layer 62.

In the depression 50 of the top cover 15, as shown in FIG. 5, a gap exists between the nameplate label 60 and the top cover. In this vacant portion, gaseous propagation from the top cover 15 is generated, and the label 60 also vibrates. Since the label 60 and the cover 15 are not directly in contact with each other in this region, the vibration suppressing effect of the nameplate label itself is lowered.

According to the present embodiment, the nameplate label 60 is pasted on the top cover 15 in a manner such that a part of the depression 50 forms the opening portion 50a. In this case, the vibration based on the gaseous propagation from the top cover 15 that is generated when the HDD is driven is discharged directly to the outside through the opening portion 50a, and excitation of vibration that is attributable to reflection from the label 60 can be suppressed. Thus, the vibrations of the top cover 15 and the nameplate label 60 can be lowered, so that noises generated from the HDD can be reduced.

The inventor hereof prepared the HDD according to the present embodiment and an HDD according to a comparative example in which the whole area of a depression of a top cover is covered by a nameplate label, and compared their noise levels. In consequence, the noise level of the HDD according to the present embodiment was found to be lower by about 1.3 dB than that of the HDD according to the comparative example in a great part of the frequency band.

According to the HDD described above, the noise level can be lowered despite the similarity of the number of parts and manufacturing processes to those of conventional HDDs. According to the foregoing arrangement, moreover, the same noise damping effect of a vibration damper that suppresses vibration of the top cover 15 can be obtained. Therefore, it is unnecessary to separately provide any vibration damper in the depression, so that the number of parts and hence the cost can be reduced.

According to the present embodiment, therefore, there may be obtained a disk device capable of reducing noises without failing to suppress an increase in manufacturing cost.

The following is a description of an HDD according to a second embodiment of this invention.

According to the second embodiment, as shown in FIG. 6, a depression 50 in a top cover 15 has a plurality of, e.g., three, opening portions 50a and 50b. A nameplate label 60 is formed with a rectangular shape and pasted on the top cover 15 in a manner such that a plurality of, e.g., three, side edges 60a and 60b cross edge portions of the depression 50. The side edges 60a and 60b of the label 60 and the depression 50 define the three opening portions 50a and 50b.

According to the second embodiment, the noise damping effect of the first embodiment can be enhanced.

According to a third embodiment shown in FIGS. 7A and 7B, a depression 50 in a top cover 15 of an HDD has one opening portion 50a. Further, the top cover 15 has a protrusion 52 formed in the depression 50. The protrusion 52 is situated adjacent to the opening portion 50a and abuts against a nameplate label 60. Specifically, the protrusion 52 is small enough not to close the opening portion 50a and allows the label 60 to be pasted thereon.

According to the third embodiment, if the nameplate label 60 that covers the depression 50 of the top cover 15 is accidentally pressed as the HDD is handled, the protrusion 52 can prevent it from sticking to the depression 50. The label 60 can maintain its good appearance without denting even when it is pressed. The same noise damping effect of the first embodiment can be also obtained with the third embodiment.

Figure 8A:
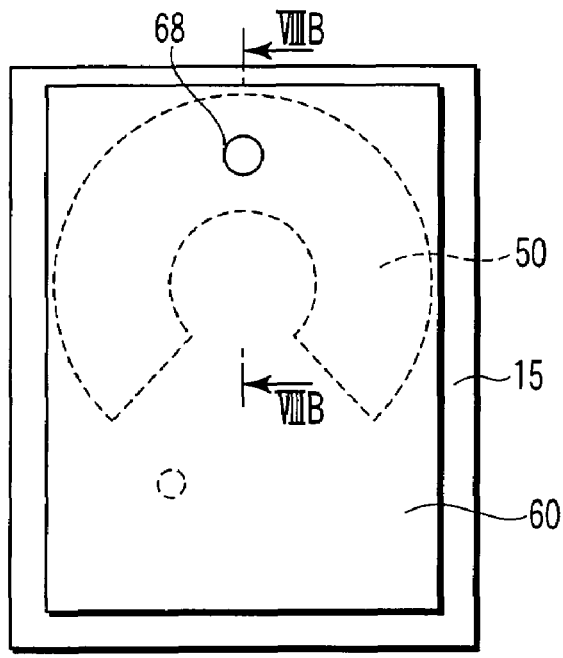
FIG. 8A is an exemplary plan view showing an HDD according to a fourth embodiment of the invention.
Figure 8B:
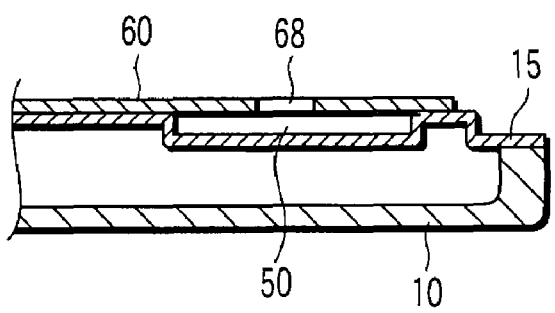
FIG. 8B is an exemplary sectional view of the HDD taken along line VIIIB-VIIIB of FIG. 8A.

According to a fourth embodiment shown in FIGS. 8A and 8B, a top cover 15 of an HDD has a depression 50, and a nameplate label 60 is pasted on the top cover so as to cover the whole area of the depression 50. The label 60 is formed with at least one aperture 68, which is located overlapping the depression 50. This aperture 68 forms an opening portion of the depression 50 that opens to the outside.

The same noise damping effect of the first embodiment can be also obtained with the fourth embodiment.

Figure 9A:
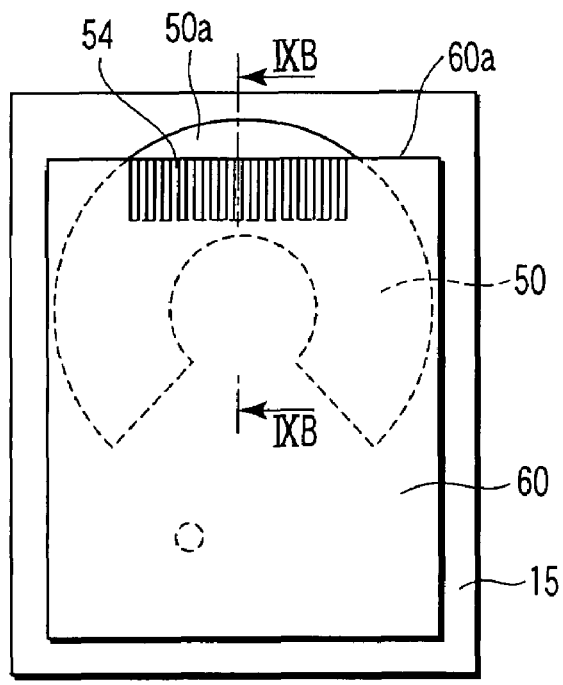
FIG. 9A is an exemplary plan view showing an HDD according to a fifth embodiment of the invention.
Figure 9B:
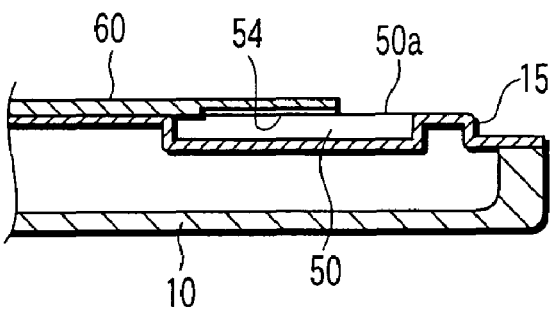
FIG. 9B is an exemplary sectional view of the HDD taken along line IXB-IXB of FIG. 9A.

According to a fifth embodiment shown in FIGS. 9A and 9B, a depression 50 in a top cover 15 of an HDD has one opening portion 50a. A nameplate label 60 that is pasted on the top cover 15 has an indication layer capable of indicating information, a viscous layer pasted on the top cover so as to overlap the indication layer, and a non-viscous region 54 with no viscous layer. The non-viscous region 54 of the label 60 is located overlapping the depression 50 and adjacent to the opening portion 50a and a side edge 60a of the label.

According to the fifth embodiment arranged in this manner, the nameplate label 60 can be prevented from sticking to the depression 50 of the top cover 15 even when it is accidentally pressed as the HDD is handled, so that the same noise damping effect of the first embodiment can be obtained. Further, the label 60 can maintain its good appearance without remaining dented even when it is pressed.

Since the second to fifth embodiments share other configurations of the HDD with the foregoing first embodiment, like reference numerals are used to designate like portions of these embodiments, and a detailed description thereof is omitted.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, this invention is not limited to HDDs but may be also applied to any other disk devices that are provided with a disk-shaped recording medium. The shape of the depression in the top cover is not limited to the foregoing embodiments but may be variously changed, if necessary. The nameplate label need not always be rectangular in shape but may be formed with any other shape selected as required.

What is claimed is:

1. A disk device comprising:
    a case having a base and a top cover;
    a disk-shaped recording medium, a mechanical section configured to rotate the recording medium, and an actuator configured to move a head, which are in the case;
    an arcuate-shaped depression being on the top cover so as to reduce windage caused by the rotation of the recording medium, the arcuate-shaped depression being disposed over the recording medium, not over the actuator, and comprising a circumference of a closer portion that is closer to the actuator and a more distant portion that is more distant to the actuator than the closer portion; and
    a label covering most of the depression, the label being pasted on the top cover to form a vacant portion with an opening at the more distant portion.

2. The disk device of claim 1, wherein the label has one side edge extending across an edge portion of the depression at the more distant portion, and the opening portion is formed by the side edge of the label and the depression.

3. The disk device of claim 1, wherein the label has a plurality of side edges extending individually across edge portions of the depression, add the side edges of the label and the depression form a plurality of opening portions.

4. The disk device of claim 1, wherein the label has an indication layer which is configured to indicate information, a viscous layer formed overlapping the indication layer and pasted on the top cover, and a non-viscous region which is located overlapping the depression and adjacent to the opening portion and the side edge and has no viscous layer.

5. The disk device of claim 1, wherein the top cover has a protrusion formed in the depression and situated adjacent to the opening portion, the protrusion abutting against the label.

6. The disk device of claim 1, wherein the label has an indication layer configured to indicate information, and a vibration damper layer for suppressing vibration of the top cover.

7. The disk device of claim 1, wherein the label has an indication layer which is configured to indicate information, a metal layer which is formed overlapping the indication layer and is configured to suppress vibration of the top cover, and a viscous layer provided overlapping the metal layer and pasted on the top cover.

8. The disk device of claim 1, wherein the depression of the top cover has the shape of a circular arc substantially concentric with the center of the recording medium.

9. The disk device of claim 1, wherein the mechanical section comprises a spindle motor which is mounted on the base and configured to support and rotate the recording medium and a head actuator which is configured to move the head with respect to the recording medium.

10. The disk device of claim 1, wherein the vacant portion has portions of covered by the label and non-covered.

11. The disk device of claim 10, wherein the vacant portion has a portion which is not covered by the label.

12. The disk device of claim 1, wherein the label is pasted on the top cover to form a vacant with an opening at a peak of the circumference of the more distant portion.

13. The disk device of claim 1, wherein the label is pasted over the actuator and mostly over the arcuate-shaped depression.

* * * * *